(12) United States Patent
Inkinen et al.

(10) Patent No.: US 9,277,350 B2
(45) Date of Patent: *Mar. 1, 2016

(54) METHOD FOR DATA COMMUNICATION BETWEEN A WIRELESS DEVICE AND A ELECTRONIC DEVICE, AND A DATA COMMUNICATION DEVICE

(71) Applicant: Memory Technologies LLC, Las Vegas, NV (US)

(72) Inventors: Sami Inkinen, Hameenlinna (FI); Simo Vapaakoski, Tampere (FI)

(73) Assignee: Memory Technologies LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/518,973

(22) Filed: Oct. 20, 2014

(65) Prior Publication Data

US 2015/0038085 A1 Feb. 5, 2015

Related U.S. Application Data

(60) Continuation of application No. 11/687,913, filed on Mar. 19, 2007, now Pat. No. 8,867,631, which is a division of application No. 09/428,813, filed on Oct. 28, 1999, now Pat. No. 7,194,038.

(51) Int. Cl.
*H04B 7/00* (2006.01)
*H04W 4/00* (2009.01)
*G06F 13/38* (2006.01)

(52) U.S. Cl.
CPC ............ *H04W 4/008* (2013.01); *G06F 13/387* (2013.01); *G06F 2213/3814* (2013.01)

(58) Field of Classification Search
CPC .... H04W 84/18; H04W 88/06; H04M 1/7253

USPC ......................................................... 455/41.2
See application file for complete search history.

(56) References Cited

U.S. PATENT DOCUMENTS 5,646,635 A 7/1997 Cockson et al.
5,671,362 A 9/1997 Cowe et al.
(Continued)

FOREIGN PATENT DOCUMENTS

DE 29711698 10/1997
DE 19612203 C1 11/1997
(Continued)

OTHER PUBLICATIONS

Non-Final Office Action for U.S. Appl. No. 11/687,913, mailed on Jan. 15, 2010, Inkinen et al, "Method for Data Communication between a Wireless Device and an Electronic Device, and a Data Communication Device", 9 pages.
(Continued)

*Primary Examiner* — April G Gonzales
(74) *Attorney, Agent, or Firm* — Lee & Hayes, PLLC (57) ABSTRACT

A method for wireless data communication between a wireless device having means for short-range data communication, and an electronic device includes mounting a data communication device having means for short-range radio frequency wireless data communication in a general purpose expansion memory location of the electronic device, activating a short-range radio frequency wireless data communication link between the wireless device and the data communication device, and transmitting data between the electronic device and the wireless device so that the wireless device operates as an ordinary expansion memory from the view point of the electronic device.

35 Claims, 4 Drawing Sheets

(56) References Cited

U.S. PATENT DOCUMENTS

| | | | |
|---|---|---|---|
| 5,765,027 | A | 6/1998 | Wang et al. |
| 5,790,688 | A | 8/1998 | Kikuchi |
| 5,831,547 | A | 11/1998 | Ohtsuki et al. |
| 5,845,214 | A | 12/1998 | Lee |
| 5,896,574 | A | 4/1999 | Bass, Sr. |
| 5,900,947 | A | 5/1999 | Kenmochi et al. |
| 5,929,774 | A | 7/1999 | Charlton |
| 6,023,587 | A | 2/2000 | Watts, Jr. et al. |
| 6,026,007 | A | 2/2000 | Jigour et al. |
| 6,032,866 | A | 3/2000 | Knighton et al. |
| 6,067,318 | A | 5/2000 | Bailey et al. |
| 6,085,225 | A | 7/2000 | Nakajima et al. |
| 6,170,743 | B1 | 1/2001 | Okaue et al. |
| 6,219,560 | B1 | 4/2001 | Erkkila et al. |
| 6,369,914 | B1 | 4/2002 | Miura |
| 6,405,049 | B2 | 6/2002 | Herrod et al. |
| 6,407,665 | B2 | 6/2002 | Maloney |
| 6,427,078 | B1 | 7/2002 | Wilska et al. |
| 6,433,889 | B1 | 8/2002 | Tanabe |
| 6,516,204 | B1 | 2/2003 | Funk et al. |
| 6,535,243 | B1 | 3/2003 | Tullis |
| 6,573,938 | B1 | 6/2003 | Schulz et al. |
| 6,587,698 | B1 | 7/2003 | Dosch |
| 6,812,958 | B1 | 11/2004 | Silvester |
| 7,440,774 | B2 * | 10/2008 | Croome ................ H04W 4/008 455/403 |
| 7,555,556 | B2 * | 6/2009 | Motoyama ............. G08C 17/02 455/41.2 |
| 2001/0040658 | A1 | 11/2001 | Nemoto et al. |
| 2001/0040685 | A1 | 11/2001 | Winter et al. |
| 2002/0044536 | A1 | 4/2002 | Izumi et al. |
| 2010/0245585 | A1 * | 9/2010 | Fisher ................ H04M 1/6066 348/164 |
| 2015/0038085 | A1 * | 2/2015 | Inkinen ................ G06F 13/387 455/41.2 |

FOREIGN PATENT DOCUMENTS

| | | |
|---|---|---|
| EP | 0763939 A2 | 3/1997 |
| EP | 0830000 A2 | 3/1998 |
| EP | 0860980 A2 | 8/1998 |
| WO | WO9848522 A1 | 10/1998 |

OTHER PUBLICATIONS

Final Office Action for U.S. Appl. No. 11/687,913, mailed onOctober 12, 2010, Inkinen et al, "Method for Data Communication between a Wireless Device and an Electronic Device, and a Data Communication Device", 10 pages.

Final Office Action for U.S. Appl. No. 09/428,813, mailed on Oct. 18, 2005, Inkinen et al, "Method for Data Communication between a Wireless Device and an Electronic Device, and a Data Communication Device", 7 pages.

Non-Final Office Action for U.S. Appl. No. 11/687,913, mailed on Nov. 16, 2011, Inkinen et al, "Method for Data Communication between a Wireless Device and an Electronic Device, and a Data Communication Device", 10 pages.

Non-Final Office Action for U.S. Appl. No. 09/428,813, mailed on Nov. 29, 2002, Inkinen et al, "Method for Data Communication between a Wireless Device and an Electronic Device, and a Data Communication Device", 9 pages.

Non-Final Office Action for U.S. Appl. No. 09/428,813, mailed on Dec. 18, 2003, Inkinen et al, "Method for Data Communication between a Wireless Device and an Electronic Device, and a Data Communication Device", 10 pages.

Non-Final Office Action for U.S. Appl. No. 09/428,813, mailed on Feb. 23, 2005, Inkinen et al, "Method for Data Communication between a Wireless Device and an Electronic Device, and a Data Communication Device", 47 pages.

Final Office Action for U.S. Appl. No. 11/687,913, mailed on Mar. 27, 2013 Inkinen et al, "Method for Data Communication between a Wireless Device and an Electronic Device, and a Data Communication Device", 17 pages.

Non-Final Office Action for U.S. Appl. No. 11/687,913, mailed on Mar. 29, 2011, Inkinen et al, "Method for Data Communication between a Wireless Device and an Electronic Device, and a Data Communication Device", 11 pages.

Non-Final Office Action for U.S. Appl. No. 09/428,813, mailed on Apr. 26, 2006, Inkinen et al, "Method for Data Communication between a Wireless Device and an Electronic Device, and a Data Communication Device", 43 pages.

Final Office Action for U.S. Appl. No. 09/428,813, mailed on May 12, 2003, Inkinen et al, "Method for Data Communication between a Wireless Device and an Electronic Device, and a Data Communication Device", 9 pages.

Final Office Action for U.S. Appl. No. 09/428,813, mailed on Jun. 1, 2004, Inkinen et al, "Method for Data Communication between a Wireless Device and an Electronic Device, and a Data Communication Device", 13 pages.

Final Office Action for U.S. Appl. No. 11/687,913, mailed on Jul. 12, 2010 Inkinen et al, "Method for Data Communication between a Wireless Device and an Electronic Device, and a Data Communication Device", 10 pages.

Final Office Action for U.S. Appl. No. 11/687,913, mailed on Jul. 25, 2012, Inkinen et al, "Method for Data Communication between a Wireless Device and an Electronic Device, and a Data Communication Device", 13 pages.

Office action for U.S. Appl. No. 11/687,913, mailed on Aug. 15, 2013, Inkinen et al, "Method for Data Communication between a Wireless Device and an Electronic Device, and a Data Communication Device", 19 pages.

Non-Final Office Action for U.S. Appl. No. 11/687,913, mailed on Sep. 28, 2012, Inkinen et al, "Method for Data Communication between a Wireless Device and an Electronic Device, and a Data Communication Device", 14 pages.

\* cited by examiner

PRIOR ART

METHOD FOR DATA COMMUNICATION BETWEEN A WIRELESS DEVICE AND A ELECTRONIC DEVICE, AND A DATA COMMUNICATION DEVICE

CROSS REFERENCE TO RELATED APPLICATION

This application is a continuation of commonly owned U.S. patent application Ser. No. 11/687,913, now U.S. Pat. No. 8,867,631, filed Mar. 19, 2007, entitled "METHOD FOR DATA COMMUNICATION BETWEEN A WIRELESS DEVICE AND AN ELECTRONIC DEVICE, AND A DATA COMMUNICATION DEVICE", which is a divisional of U.S. patent application Ser. No. 09/428,813, now U.S. Pat. No. 7,194,038, filed Oct. 28, 1999 entitled "METHOD FOR DATA COMMUNICATION BETWEEN A WIRELESS DEVICE AND AN ELECTRIC DEVICE, AND A DATA COMMUNICATION DEVICE", which claims priority to Finland Patent Application No. 982353, filed Oct. 29, 1998; the entirety of U.S. patent application Ser. No. 09/428,813 is herein incorporated by reference.

BACKGROUND

1. Field

Disclosed herein is an advantageous way to connect electronics equipment for instance to a mobile station via a standardised interface for short-range wireless data communication, and a data communication device connected to this standardised interface.

2. Brief Description of Related Developments

Figure 1:
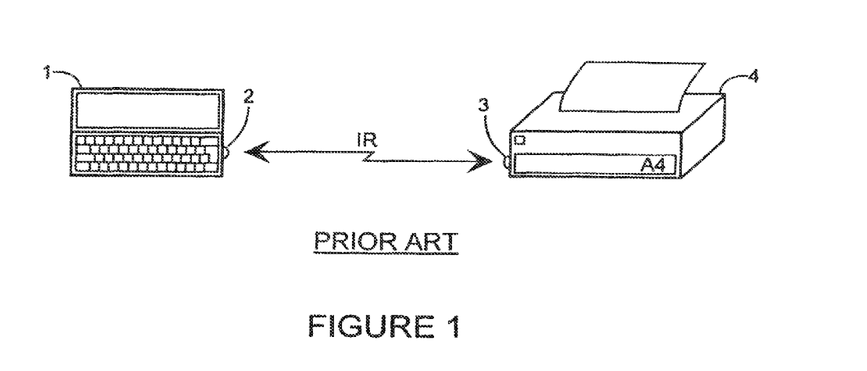
FIG. 1 shows a known arrangement for data communication between a mobile station and an electronic device.

It is previously known to connect a portable computer and a mobile station 1 via an infrared (IR) link to a printer 4 shown in FIG. 1. Then an IR transmitter/receiver 2, 3 is constructed in the devices 1, 4 being parties of the data communication, and routines required by the data communication has been designed in the software of the devices 1, 4.

There are also known mobile communications applications developed particularly in connection with portable data processing equipment, such as laptop PCs. In these applications at least the transmitter/receiver functions of the mobile station are realised in a PC Card. A PC Card is an expansion card with an interface to the electronic device, such as a computer, which interface is defined by the PCMCIA standard (Personal Computer Memory Card International Association). For instance an expansion card containing a transmitter/receiver of a GSM mobile station is used for data communication in order to connect the electronic device to the GSM network. However, the use of the application requires pre-installed software in the electronic device.

There is also known a low power radio frequency (LPRF) or a short-range radio frequency link, which replaces a connection cable between electronic devices, and which is defined at least by the Bluetooth Special Interest Group. This concerns an unfinished industry standard where the communication link is intended to be realised at a vacant ISM frequency (Industrial, Scientific, Medical) of 2.45 GHz and at a power of 0 dBm or 1 mW, whereby the range is 10 meters and the data transmission rate is 721 kbit/s. The link uses frequency hopping and a time divided duplex connection. Reference: Codename Bluetooth, A Global Specification for Wireless Connectivity, Bluetooth Special Interest Group, www.bluetooth.com, 1988.

It is also known to expand the features of mobile stations with the aid of expansion cards. Then for instance a digital camera is connected to the mobile station.

A problem in known devices is that they require identification of the expansion card and co-operation in the electronic device. An electronic device connecting a mobile station to a cellular radio network requires special software for the data communication link and a sufficient processor capacity.

SUMMARY

The object of the invention is to present a new method for realising the data communication between electronic devices and a wireless device, and a data communication device which can be connected to a general purpose expansion card interface. The data communication device is particularly suited for electronic devices having insufficient processor capacity for the functions required by a data communication network. Further the use of the data communication device does not require preparations in the device to be connected, such as particular software for the data communication.

The invention relates to a method for wireless data communication between a wireless device, which comprises means for short-range data communication, and an electronic device. According to the invention the method comprises the following method steps:

in the general purpose expansion memory location of the electronic device there is mounted a data communication device having means for short-range wireless data communication;

the short-range wireless data communication link between the wireless device and the data communication device is activated; and data is transmitted between the data communication device and the wireless device.

The invention relates also to a data communication device for wireless data communication between a wireless device, which has means for a short-range data link, and an electronic device. According to the invention the data communication device comprises a controller, which can be connected to the general purpose interface of an expansion memory location of the electronic device for controlling the operation of the data communication device, a short-range wireless data communication unit and an antenna for data communication; and a memory for storing the communicated data.

According to the invention there is used a particular memory card, which is mounted in a general purpose expansion memory location of a separate electronic device, such as a digital camera, and which contains a data communication feature for transmitting the memory contents to a wireless device. A general purpose expansion memory location of this kind is defined for instance in the ATA (Attachment Interface) specification. Expansion cards containing memory which can be written and read are called Compact Flash, in accordance with the small-sized cards generally containing Flash EEPROM memory. The data communication utilises for instance a short-range radio frequency LPRF link. The memory card is also suitable for instance for a personal digital assistant (PDA), where the entered data can be stored in the expansion memory. Due to the duplex characteristic of the expansion memory the data can be also transmitted at a radio frequency to a wireless device, or generally to an LPRF device. The data communication characteristics of the wireless device are available for transmitting the data forward.

A data communication device according to the invention is based on the use of a virtual duplex memory. The data communication device comprises memory, a short-range radio frequency link unit, and control logic. The memory is for instance Flash memory, RAM (Random Access Memory) or RAM memory with battery back-up. Regarding the operation of the electronic device the data communication device is used as ordinary expansion memory, but the data can be read and written also by an external device, such as by a mobile station using a short-range radio frequency link. The data communication is most preferably started automatically so that it is triggered by the storing of new data, but transmission is also possible so that it is activated by an external device.

The data communication according to the invention is suitable particularly for the transmission of digital pictures between a mobile station, such as a communicator or a smart phone, and a digital camera, but also for the transmission of data, such as the contents of a calendar, between a personal digital notebook or a portable computer and a mobile station.

An advantage of the invention is that the data communication device fits in a general purpose expansion memory location, whereby the electronic device, such as a camera, requires no hardware changes and also no software changes for the data communication. A general purpose expansion memory location is common in digital cameras, but the I/O ports (Input/Output) actually intended for data communication are not. Thus the method according to the invention enables the transmission of pictures to a separate device also from a camera which does not contain facilities for the transmission of pictures.

Another advantage of the invention is the wireless data communication in connection with a device having a processor capacity which is insufficient in order to realise the functions required for wireless data communication.

A further advantage of the invention is the extra memory which the data communication device provides to the electronic device in addition to the data communication characteristics.

Advantageous embodiments of the invention are presented in the dependent claims.

BRIEF DESCRIPTION OF THE DRAWINGS

The invention is described in detail below with reference to the enclosed drawing, in which.

DETAILED DESCRIPTION OF THE PREFERRED EMBODIMENT(S)

FIG. 1 was discussed above in the section regarding prior art.

Figure 2:
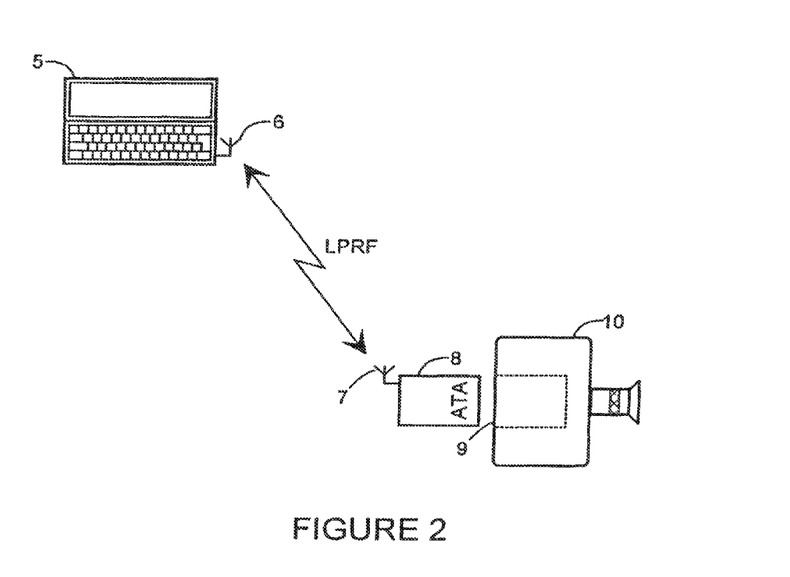
FIG. 2 shows an arrangement according to the invention for data communication between a mobile station and an electronic device.

FIG. 2 shows an arrangement according to the invention where we can see a mobile station 5 and a camera 10. A data communication device 8 is mounted in the camera's 10 general purpose expansion memory location 9 for the storing and transmission of pictures. The wireless data communication between the wireless device 5 and the data communication unit 8 is made by a short-range radio link via the antennas 6, 7. The interface of the data communication device 8 to the camera 10 is for instance of the ATA type presented in the figure, and the short-range radio link is of the LPRF type.

Figure 3:
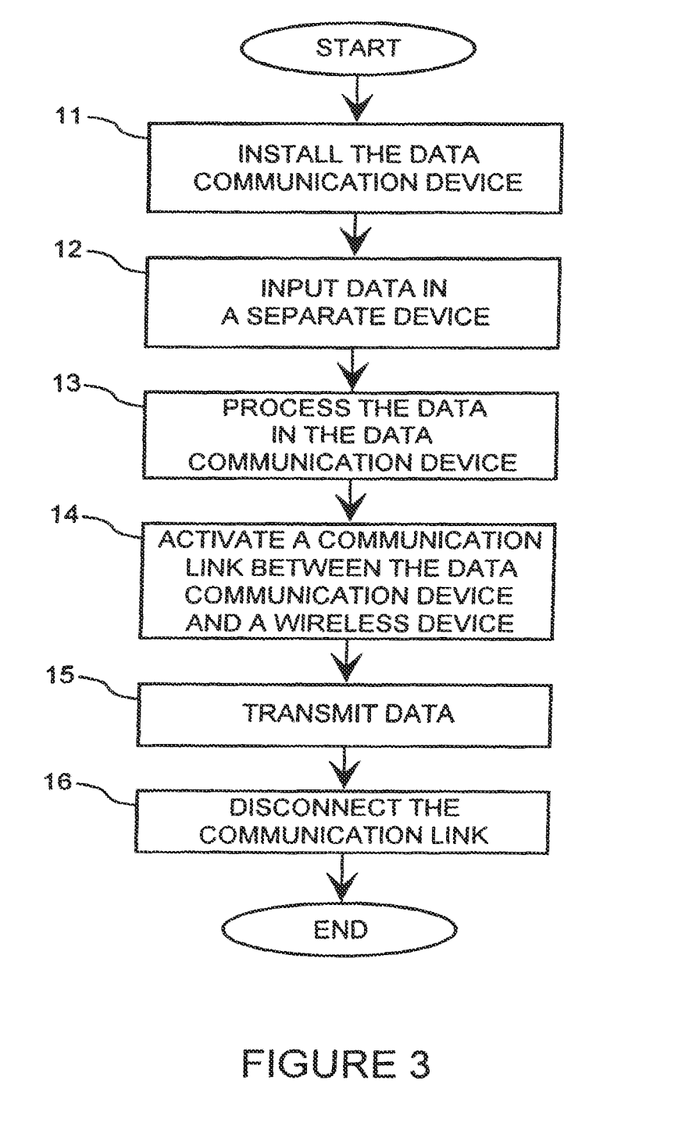
FIG. 3 shows a flow diagram of a method according to the invention for data communication between a wireless device and an electronic device.

FIG. 3 shows in a flow diagram a method according to the invention for data communication between a wireless device and an electronic device. First a data communication device is mounted 11 in the electronic device. The installation is made by pushing a data communication device according to the invention into a general purpose expansion memory location of the electronic device. Regarding the electronic device the data communication device is to this end a common expansion memory card.

Data is input 12 to the electronic device. The input data is for instance a picture reflected as light through an objective, or a daily schedule created by the user. The data is processed 13 in the data communication device, for instance by storing the above input data into the data communication device mounted in the expansion memory location. The storing of data and any reading of data is made by particular instructions, such as ATA instructions. However, data input 12 or processing 13 is not performed if data is simultaneously transmitted by the wireless device to the electronic device.

The data communication link from the wireless device to the data communication device is activated 14. Data is transmitted 15 between the data communication device and the wireless device, most preferably automatically on the basis of the logic of the data communication device so that the transmission is activated when data is stored, whereby the data communication device has information about the receiving device, such as an address code, in order to perform the transmission. Alternatively the data is transmitted on the bases of instructions given by the wireless device. The data communication link from the wireless device to the data communication device is disconnected 16.

Figure 4:
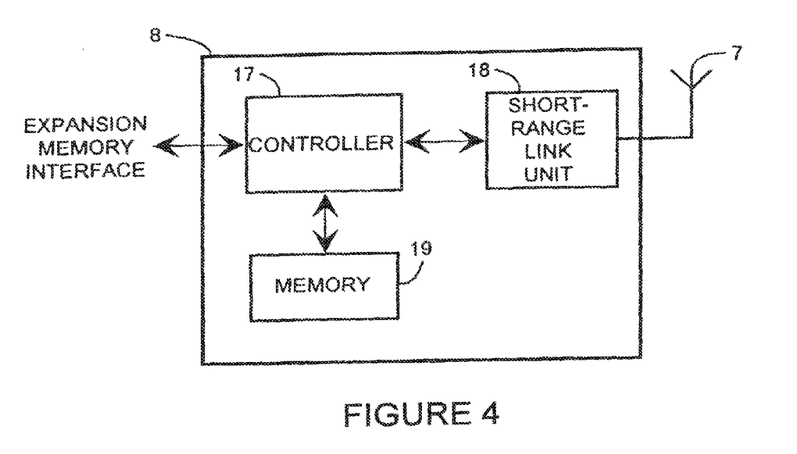
FIG. 4 shows a block diagram of a data communication device according to the invention.

FIG. 4 shows a block diagram of a data communication device 8 according to the invention. In the data communication device 8 there is seen a controller 17 connected to the general purpose expansion memory interface of the expansion memory location for controlling the operation of the data communication device, a short-range data communication link unit 18, such as a short range radio link LPRF unit, and an antenna 7 for the data communication, and a memory 19, such as a Flash memory or a RAM memory, for storing data. The LPRF unit contains for instance sections according to the Bluetooth industry standard, such as a radio unit, a link control and management unit, and software facilities. Other ways to realise the short-range link are for instance infrared (IR), acoustic ultrasonic data communication, and a wireless local area network (WLAN).

Figure 5:
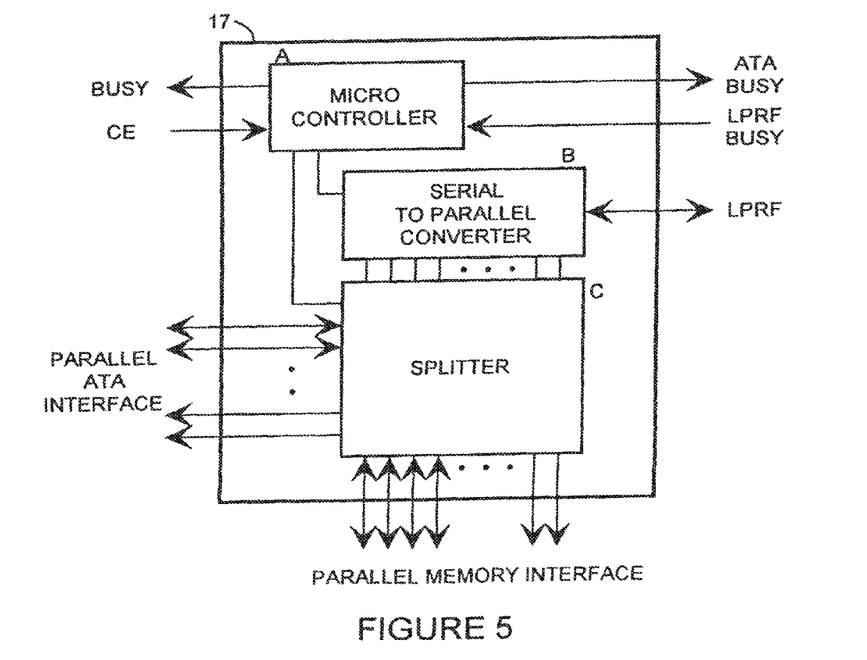
FIG. 5 shows a block diagram of the controller of a data communication device according to the invention.

FIG. 5 shows a more detailed block diagram of the controller 17 shown generally in FIG. 4, when the expansion memory interface is an ATA interface, and the short-range data communication link unit 18 is an LPRF unit. In the controller there is seen a microcontroller A, a serial to parallel converter B and a splitter C. The microcontroller A gives a busy signal BUSY to the electronic device when the memory 19 is processed by the radio link, and a signal ATA BUSY to the LPRF unit when the memory 19 is processed by the electronic device. Further there is given to the microcontroller a card operation enable (CE) signal A when the memory 19 is processed by the electronic device, and an LPRF BUSY signal when the LPRF unit 18 is occupied for data communication. To a man skilled in the art it obvious that in general a data communication device according to the invention comprises means for giving to the microcontroller an operation enable signal enabling the operation of the data communication device when the memory is processed by the electronic device, and a busy signal when the LPRF unit is occupied for data communication. The microcontroller A controls the series-parallel converter B and the splitter C. The serial to parallel converter B converts the memory's 19 parallel mode data into the serial mode used by the LPRF unit 18, and correspondingly it converts the serial mode into the parallel mode. The splitter C connects the memory's 19 parallel mode write and read connection alternatively to the ATA interface of the electronic device or to the serial to parallel converter 8 for the LPRF link.

Figure 6:
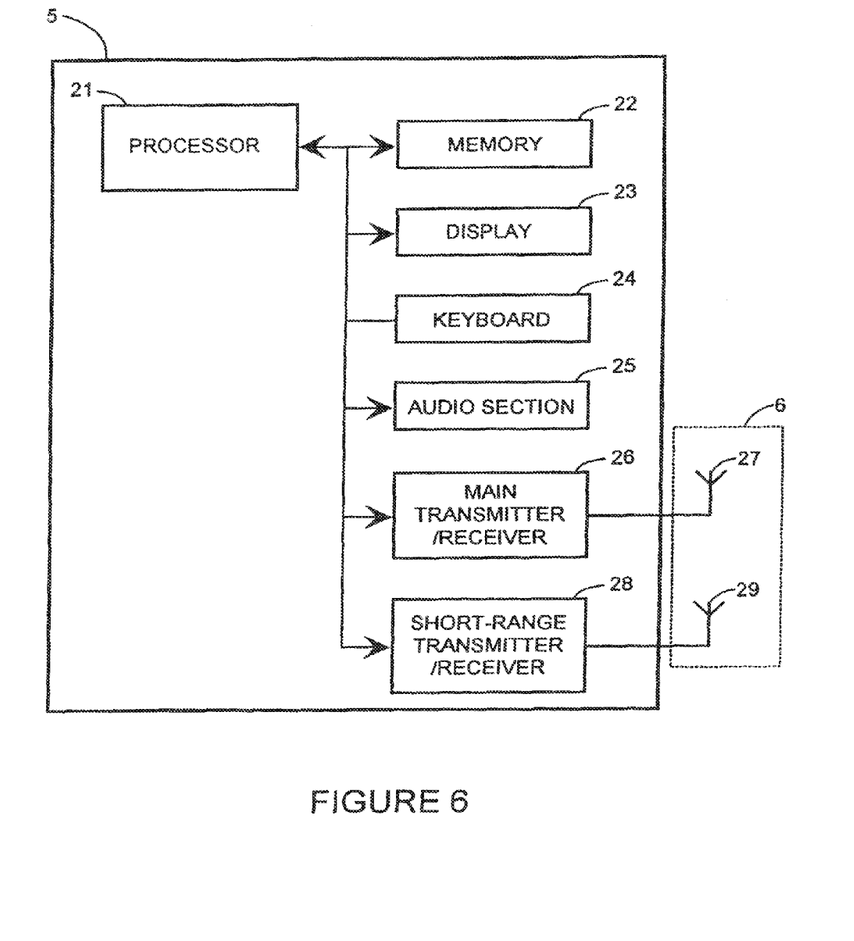
FIG. 6 shows essential parts in a wireless device according to the invention.

FIG. 6 shows a block diagram of such parts in a wireless device 5 according to the invention which are essential to the invention. In the mobile station 5 we can see a processor 21 for processing the normal operations and the data communication according to the invention, a memory 22 for storing the data of the data communication and the program, a display 23 for displaying program outputs, a keyboard 24 for using the data communication, an audio section 25 for speech facilities, a main transmitter/receiver 26 and an antenna 27 for normal traffic, and a short-range data communication transmitter/receiver 28 and antenna 29 for the data communication, such as LPRF, between the wireless device 5 and the data communication device 10. The LPRF transmitter/receiver contains for instance sections according to the Bluetooth industry standard, such as a radio unit, a link control unit, and a link management unit and program functions.

As an example let us examine the transmission of pictures from a common digital camera to a mobile station of the communicator type. The camera has a Compact Flash expansion memory location with an ATA interface of a general type, a data communication unit according to the invention attached to it, and the mobile station has an LPRF interface. Pictures are taken with the camera and stored in the data communication unit in the same way as in a common expansion memory. The mobile station activates the LPRF communication link of the data communication unit and requests transmission of the stored data to the mobile station. The memory of the data communication unit is allocated to the LPRF link and the data transmission to the mobile station is started. However, no information is conveyed to the camera about the operation, because from the viewpoint of the camera the data communication unit is only an expansion memory. However, if the camera tries to process the expansion memory during the LPRF data transmission, this is not possible as it is prevented by a busy signal so that data can not be changed when another processes it. In this way consistent memory contents are maintained.

When the pictures have been transmitted to the mobile station the features and the capacity of the data communication network can be used to forward the pictures. Thanks to the LPRF link and the wireless device an electronic device such as a digital camera, has thus a world-wide range for the transmission of the pictures.

In this context an electronic device means some other device than a wireless device being one party in the data communication and having the means required by the short-range data communication link. Further a wireless device means most preferably a mobile station, but also any other device used for wireless data communication. A mobile station is particularly suitable due to the possible dual utilisation of the antenna and the radio frequency sections. The sections can be used both for normal traffic and for short-range data communication. Such mobile stations operating on two frequency bands are generally known in GSM systems.

As another example let us examine the transmission of the camera's pictures, in a manner according to the invention, to a common electronic device, such as a printer having the means required by the short-range data communication. Then the camera has a data communication unit according to the invention, and when a picture is stored in the camera it causes the transmission of the picture to another electronic device. Thus the contents of the expansion memory is kept the same at least in a unidirectional sense, and the camera pictures are available for instance to a printer, for instance for immediate printing.

The invention is not limited to relate only to the above presented embodiment examples, but many modifications are possible within the inventive idea defined by the claims.

What is claimed is:

1. An apparatus, comprising:
    an interface configured to connect the apparatus to a memory expansion interface of a host device, wherein the memory expansion interface is compliant with a defined memory expansion interface specification;
    a data storage memory;
    a memory controller configured to write data received from the host device through the memory expansion interface to the data storage memory, the memory controller configured to receive the data from the host device based at least on instructions received from the host device that are compliant with the defined memory expansion interface specification; and
    a wireless data communication unit configured to transmit, to a wireless device, at least a portion of the data written to the data storage memory, transmission of the at least the portion of the data to the wireless device responsive, at least in part, to an instruction received from the wireless device to transmit the at least the portion of the data.

2. The apparatus of claim 1, wherein the wireless data communication unit transmits on a radio link.

3. The apparatus of claim 1, wherein the wireless data communication unit transmits on a wireless local area network.

4. The apparatus of claim 1, wherein the wireless data communication unit transmits on an industrial, scientific, medical (ISM) frequency band.

5. The apparatus of claim 1, wherein the wireless data communication unit is compliant with a Bluetooth standard.

6. The apparatus of claim 1, embodied as a card that fits in a location within the host device, the location being compliant with the defined memory expansion interface specification.

7. The apparatus of claim 1, wherein the host device comprises one or more of a digital camera or a computing device.

8. The apparatus of claim 1, wherein the wireless device comprises a processor, a memory, and a transceiver.

9. The apparatus of claim 1, wherein the defined memory expansion interface specification comprises a Flash memory expansion interface specification.

10. The apparatus of claim 1, wherein the data storage memory comprises Flash memory.

11. The apparatus of claim 1, wherein the memory controller is configured to inhibit access by the host device to the data storage memory when the at least the portion of the data written to the data storage memory is wirelessly transmitted.

12. A method performed by an apparatus, the method comprising:
    interfacing with a memory expansion interface of a host device, wherein the memory expansion interface is compliant with a defined memory expansion interface specification, the apparatus comprising a data storage memory and a wireless data communication unit;

receiving data from the host device by use of instructions compliant with the defined memory expansion interface specification;

writing the data received through the memory expansion interface from the host device to the data storage memory; and responsive at least in part to receiving instructions received from a wireless device, wirelessly transmitting to the wireless device at least a portion of the data received through the memory expansion interface and written to the data storage memory.

13. The method of claim 12, wherein the wirelessly transmitting includes transmitting on a radio link.

14. The method of claim 12, wherein the wirelessly transmitting includes transmitting on a wireless local area network.

15. The method of claim 12, wherein the wirelessly transmitting includes transmitting on an industrial, scientific, medical (ISM) frequency band.

16. The method of claim 12, wherein the wireless data communication unit is compliant with a Bluetooth standard.

17. The method of claim 12, wherein the memory expansion interface is compliant with a Flash memory expansion interface specification and wherein the data storage memory comprises Flash memory.

18. The method of claim 12, wherein the defined memory expansion interface specification is compliant with an Advanced Technology Attachment (ATA) specification.

19. The method of claim 12, further comprising inhibiting access to the data storage memory by the host device while the at least the portion of the data written to the data storage memory of the apparatus is wirelessly transmitted to the wireless device.

20. A method performed by a wireless device, the method comprising:

establishing wireless communication with a wireless data communication unit of a memory expansion card placed into a memory expansion interface of a host device, wherein the memory expansion interface is compliant with a defined memory expansion interface specification and wherein the memory expansion card comprises a data storage memory configured to be read and written through the memory expansion interface in a manner that is compliant with the defined memory expansion interface specification;

wirelessly transmitting an instruction to the wireless data communication unit of the memory expansion card, the instruction to provide at least a portion of data that is written to the data storage memory by the host device via the memory expansion interface; and wirelessly receiving, from the wireless data communication unit of the memory expansion card, the at least the portion of the data stored in the data storage memory.

21. The method of claim 20, wherein the wirelessly transmitting and the wirelessly receiving are via a radio link.

22. The method of claim 20, wherein the wirelessly transmitting and the wirelessly receiving are via a wireless local area network.

23. The method of 20, wherein the wirelessly transmitting and the wirelessly receiving are via an industrial, scientific, medical (ISM) frequency band.

24. The method of claim 20, wherein the wirelessly transmitting and the wirelessly receiving are in accordance with a Bluetooth standard.

25. The method of claim 20, wherein the host device comprises one or more of a digital camera or a computing device.

26. The method of claim 20, wherein the at least the portion of the data is an image, wherein the wireless device comprises a printer, and wherein the method further comprises causing the image to be printed by the printer.

27. A computing system, comprising:

a processor;

a transceiver coupled to the processor;

a memory; and one or more modules stored on the memory and executable by the processor to cause the computing system to:

establish wireless communication, via the transceiver, with a wireless data communication unit of a memory expansion card placed into a memory expansion interface of a host device, wherein the memory expansion interface is compliant with a defined memory expansion interface specification and wherein the memory expansion card comprises a data storage memory configured to be read and written through the memory expansion interface in a manner that is compliant with the defined memory expansion interface specification;

wirelessly transmit, via the transceiver, an instruction to the wireless data communication unit of the memory expansion card, the instruction to provide at least a portion of data that is written to the data storage memory by the host device via the memory expansion interface; and wirelessly receive, via the transceiver and from the wireless data communication unit of the memory expansion card, the at least the portion of the data stored in the data storage memory.

28. The computing system of claim 27, wherein the transceiver is configured to transmit and receive on a radio link.

29. The computing system of claim 27, wherein the transceiver is configured to transmit and receive on a wireless local area network.

30. The computing system of claim 27, wherein the transceiver is configured to transmit and receive on an industrial, scientific, medical (ISM) frequency band.

31. The computing system of claim 27, wherein the wirelessly transmitting and the wirelessly receiving are in accordance with a Bluetooth standard.

32. The computing system of claim 27, further comprising a display, wherein the at least the portion of the data is an image, and wherein the one or more modules are further executable by the processor to cause the computing system to cause the image to be displayed on the display.

33. An apparatus, comprising:

an interface means for connecting the apparatus to a memory expansion interface of a host device, wherein the memory expansion interface is compliant with a defined memory expansion interface specification;

a data storage means for storing data received from the host device;

a controller means for writing the data received from the host device through the memory expansion interface to the data storage means, the controller means configured to receive the data from the host device based at least on instructions received from the host device that are compliant with the defined memory expansion interface specification; and a wireless data communication means for transmitting, to a wireless device, at least a portion of the data written to the data storage means, transmission of at least the portion of the data to the wireless device responsive, at least in part, to an instruction received from the wireless device to transmit the at least the portion of the data.

34. The apparatus of claim 33, wherein the wireless data communication means is compliant with a Bluetooth standard.

35. The apparatus of claim 33, wherein the data storage means comprises Flash memory.

* * * * *